(12) United States Patent
Bensmann

(10) Patent No.: US 11,981,432 B2
(45) Date of Patent: May 14, 2024

(54) WING FOR AN AIRCRAFT

(71) Applicant: AIRBUS OPERATIONS GMBH, Hamburg (DE)

(72) Inventor: Stefan Bensmann, Weyhe (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/779,456

(22) PCT Filed: Nov. 3, 2020

(86) PCT No.: PCT/EP2020/080808
§ 371 (c)(1),
(2) Date: May 24, 2022

(87) PCT Pub. No.: WO2021/104808
PCT Pub. Date: Jun. 3, 2021

(65) Prior Publication Data
US 2023/0002032 A1   Jan. 5, 2023

(30) Foreign Application Priority Data
Nov. 25, 2019 (DE) .................. 10 2019 131 846.7

(51) Int. Cl.
*B64C 9/24* (2006.01)
*B64C 3/50* (2006.01)
*B64D 45/00* (2006.01)

(52) U.S. Cl.
CPC ............ *B64C 9/24* (2013.01); *B64C 3/50* (2013.01); *B64D 45/00* (2013.01)

(58) Field of Classification Search
CPC ............................................. B64C 2009/143
See application file for complete search history.

(56) References Cited

U.S. PATENT DOCUMENTS 5,799,684 A * 9/1998 Cluett .................. F16K 17/40
137/71
6,682,023 B2 * 1/2004 Broadbent ............... B64C 9/26
244/214

(Continued)

FOREIGN PATENT DOCUMENTS

| DE | 10 2009 051 983 | 5/2011 | |
|----|----|----|----|
| EP | 3 501 977 | 6/2019 | |
| GB | 2553847 A * | 3/2018 | .............. B64C 9/16 |

OTHER PUBLICATIONS

German Search Report for German Application No. 10 2019 131 846.7 dated Sep. 16, 2020, 6 pages.

(Continued)

*Primary Examiner* — Assres H Woldemaryam
*Assistant Examiner* — Anna L. Gordon
(74) *Attorney, Agent, or Firm* — Nixon & Vanderhye P.C.

(57) ABSTRACT

A wing (5) for an aircraft (1) including a fixed wing (7), a high-lift device (15) and a hold-down arrangement (27) between two supports (23, 25) and having a first hold-down element (29) attached to the high-lift device (15) and a second hold-down element (31) attached to the fixed wing (7). The first hold-down element (29) contacts the second hold-down element (31) when the high-lift device (15) is in a retracted position to prevent a trailing edge (22) of the high-lift device (15) from detaching from an upper surface (19) of the fixed wing (7). One of the hold-down elements (29, 31) is a load-limited hold-down element (32) which is destroyed when loads transmitted through the hold down elements (29, 31) exceed a threshold. Once destroyed, the trailing edge (22) of the high-lift device (15) is not prevented from detaching from the upper surface (19).

13 Claims, 3 Drawing Sheets

(56) References Cited

U.S. PATENT DOCUMENTS

| | | |
|---|---|---|
| 7,878,460 B2 | 2/2011 | Armstrong et al. |
| 2006/0038088 A1 | 2/2006 | Dodson |
| 2006/0220896 A1* | 10/2006 | Luberda .................. G08B 5/36 340/815.4 |
| 2007/0045477 A1* | 3/2007 | Armstrong ............. B64D 15/12 244/214 |
| 2012/0312932 A1 | 12/2012 | Hue et al. |
| 2018/0111697 A1* | 4/2018 | Jones ................ B64D 45/0005 |
| 2021/0371083 A1* | 12/2021 | Lambton ................ B64C 13/04 |

OTHER PUBLICATIONS

International Search Report for PCT/EP2020/080808 dated Feb. 9, 2021, 4 pages.
Written Opinion of the ISA for PCT/EP2019/080808 dated Feb. 9, 2021, 8 pages.

* cited by examiner

WING FOR AN AIRCRAFT

RELATED APPLICATIONS

This application is the U.S. national phase of International Application PCT/EP2020/080808, filed Nov. 3, 2020, which designated the U.S. and claims priority to German Patent Application DE 10 2019 131 846.7, filed Nov. 25, 2019, the entire contents of each of which are hereby incorporated by reference.

BACKGROUND AND SUMMARY

The present invention is directed to a wing for an aircraft comprising a fixed wing, a high-lift device and a hold-down arrangement. The fixed wing has a leading edge extending along a spanwise direction of the fixed wing and an upper surface forming a suction side of the fixed wing. The high-lift device is movable between a retracted position and a deployed position and attached to the leading edge of the fixed wing via a first support and a second support. The first support is spaced apart from the second support in the spanwise direction. In the retracted position a trailing edge of the high-lift device is in extended contact with the upper surface of the fixed wing. The hold-down arrangement is arranged between the first support and the second support and comprises a first hold-down element attached to the high-lift device and a second hold-down element attached to the fixed wing. The hold-down arrangement is configured such that the first hold-down element only contacts the second hold-down element when the high-lift device is in the retracted position. In the retracted position of the high-lift device the hold-down arrangement prevents the trailing edge of the high-lift device from detaching from the upper surface of the fixed wing when the fixed wing deforms or bends in the spanwise direction. The invention is further directed to a hold-down arrangement and an aircraft comprising a wing.

High-lift devices such as slats are commonly mounted to a leading edge of a fixed wing of an aircraft using a first support and a second support. For example, slats are mounted using a master slat track and a slave slat track. Both slat tracks are driven, however only the master slat track fixes the position of the slat in a spanwise direction whereas the slave slat track does not fix the slat position in the spanwise direction but allows a spanwise displacement of the slat relative to the slave slat track. For aerodynamic reasons the slat is mounted to the fixed wing such that in the retracted position an upper surface of the slat extends flush with an upper surface of the fixed wing which forms the suction side of the wing. The slat is, in particular, arranged such that there is no gap between the upper surface of the fixed wing and the trailing edge of the slat, i.e., the trailing edge is in extended contact with the upper surface of the fixed wing, and the shape of the slat in the spanwise direction of the wing generally follows the shape of the fixed wing.

As the slat is mounted to the fixed wing in two points only which are spaced from one another in the spanwise direction of the wing, bending or deformation of the fixed wing along the spanwise direction is not transmitted to the slat. This may result in the trailing edge of the slat not being in continuous or extended contact with the upper surface of the fixed wing or even completely detaching from the upper surface. Also, the shape of the slat in the spanwise direction of the wing does not conform to the shape of the fixed wing anymore.

In order to ensure that the trailing edge of the high-lift device remains in extended contact with the upper surface of the fixed wing when the high-lift device is in the retracted position, a hold-down arrangement is provided between the first support and the second support which prevents the trailing edge of the high-lift device from detaching from the upper surface and forces the slat to deform with the fixed wing. To this end the hold-down arrangement comprises a first hold-down element attached to the high-lift device and a second hold-down element attached to the fixed wing. The hold-down elements are only in contact with each other when the slat is in the retracted position.

When a wing tip of the fixed wing bends upwards during flight, for example, due to the lift generated by the fixed wing, the second hold-down element pushes downwards against the first hold-down element due to the deformation of the fixed wing and forces the high-lift device to bend with the fixed wing. Thus, in essence a third contact point between the high-lift device and the fixed wing is created in addition to the first and second support which in the retracted position ensures that the high-lift device is forced to deform with the fixed wing so that the upper surface of the high-lift device remains flush with the upper surface of the fixed wing.

The transfer of the spanwise deformation from the fixed wing to the high-lift device by means of the hold-down arrangement requires a high-lift device that is able to withstand the same spanwise deformation as the fixed wing and withstand the loads generated by the hold-down arrangement. Thus, a high-lift device being forced to deform with the fixed wing and, thereby, providing the necessary aerodynamic performance has to be able to be more robust and in consequence heavier than a high-lift device that does not follow the spanwise deformation of the fixed wing. Also, the fixed wing has to be more robust as it has to bear the additional loads that are required for deforming the high-lift device.

In view of the above it is an object of the present invention to provide an improved wing, an improved hold-down arrangement and an improved aircraft.

According to a first aspect the problem underlying the present invention is solved by a wing for an aircraft comprising a fixed wing, a high lift device and a hold-down arrangement. The fixed wing has a leading edge extending along a spanwise direction of the fixed wing and an upper surface forming a suction side of the fixed wing. The high-lift device is movable between a retracted position and a deployed position and attached to the leading edge of the fixed wing via a first support and a second support. The first support is spaced apart from the second support in the spanwise direction. In the retracted position a trailing edge of the high-lift device is in extended contact with the upper surface of the fixed wing. The hold-down arrangement is arranged between the first support and the second support and comprises a first hold-down element attached to the high-lift device and a second hold-down element attached to the fixed wing. The hold-down arrangement is configured such that the first hold-down element is in contact with the second hold-down element when the high-lift device is in the retracted position but is not in contact with the second hold-down in element when the high-lift device is in the deployed position. In the retracted position of the high-lift device the hold-down arrangement prevents the trailing edge of the high-lift device from detaching from the upper surface of the fixed wing when the fixed wing deforms in the spanwise direction. One of the first hold-down element and the second hold-down element is a load-limited hold-down element. The load-limited hold-down element is configured to be destroyed when loads transmitted through the load-limited hold-down element for preventing the trailing edge of the high-lift device from detaching from the upper surface of the fixed wing exceed a threshold, wherein the hold-down arrangement does not prevent the trailing edge of the high-lift device from detaching from the upper surface of the fixed wing after the load-limited hold-down element has been destroyed.

In other words, the present wing for an aircraft is, for example, a main wing with a fixed wing and a high-lift device in form of a slat. The fixed wing has a leading edge which extends along but not necessarily parallel to the spanwise direction of the fixed wing. An upper surface of the fixed wing forms a suction side of the fixed wing and may also be referred to as a suction surface of the fixed wing. The fixed wing extends in the spanwise direction between an inward or inboard end which may, for example, be adapted to be attached to a fuselage of an aircraft, and a wing tip which forms the outer or outboard end of the fixed wing.

When the aircraft is in flight, the lift created by the fixed wing deforms the wing. In particular, the wing is curved upwards such that the wing tip moves upwards relative to the inward end of the fixed wing. The amount by which the fixed wing bends or deforms depends on various factors among which are speed of the aircraft and weather conditions. For example, the deformation of the fixed wing increases considerably when an aircraft accelerated from take-off speed to cruise speed.

The high-lift device attached to the wing is mounted to the wing using only two supports, a first support and a second support. The supports which may, for example, be slat tracks are used to move the high-lift device between a retracted and one or more deployed positions. When the high-lift device is in the retracted position, its trailing edge shall for aerodynamic reasons be in extended contact with the upper surface of the fixed wing such that an upper surface of the high-lift device extends flush with the upper surface of the fixed wing, i.e., such that no gap exists between the upper surface of the fixed wing and the trailing edge of the high-lift device.

As previously discussed, due to the changing curvature of the fixed wing during flight and the fact that the high-lift device is only mounted in two points to the fixed wing, the slat does not deform with the fixed wing in the spanwise direction. Hence, a hold-down arrangement comprising a first and a second hold down element is used to provide a third contact point between the high-lift device and the fixed wing when the high-lift device has been retracted, i.e., is in the retracted position. The first hold-down element is attached or mounted to the high-lift device and the second hold-down element is mounted to the fixed wing such that the first hold-down element and the second hold-down element only come into contact or engage when the high-lift device is in the retracted position. By means of the hold-down arrangement it is ensured that a relative downward deformation of the fixed wing in the spanwise direction between the first and the second support of the high-lift device corresponding to an upward movement of the wing tip of the fixed wing relative to the fixed wing's inward end is transferred to the high-lift device such that the high-lift device follows the curvature or deformation of the fixed wing. As a result, the trailing edge of the high-lift device constantly maintains extended contact with the upper surface of the fixed wing.

However, according to the present invention one of the first and the second hold-down elements is a load-limited hold-down element. The load-limited hold-down element is configured such that it is destroyed or collapses when the load acting on the load-limited hold-down element exceeds a threshold. The loads are created when the second hold-down element is pushed downwards onto the first hold-down element by the deformation of the fixed wing in the spanwise direction. Once the load-limited hold-down element has been destroyed, the hold-down arrangement cannot prevent the trailing edge of the high-lift device from detaching from the upper surface of the fixed wing anymore. Hence, the destroyed load-limited hold-down element needs to be replaced in order to restore the function of the hold-down arrangement.

The threshold may, for example, be chosen such that the load-limited hold-down element is not destroyed when the spanwise deformation of the fixed wing is within limits that are experienced during regular flights but are only experienced in extreme corners of the flight envelope. In any case the threshold is chosen such that the load-limited hold-down element is destroyed well-before the spanwise deformation of the fixed wing reaches operational limits.

Thereby, the loads transmitted through the hold-down arrangement are advantageously limited to loads occurring during regular flight conditions for which it is essential to keep the trailing edge of the high-lift device in extended contact with the upper surface of the fixed wing to improve the aerodynamic performance of the wing. However, during rare and extreme flight situation in which the curvature of the fixed wing along the spanwise direction exceeds commonly occurring curvatures, the load-limited hold-down element is destroyed by the forces acting thereon. In such a rare case aerodynamic performance of the wing is of less concern and it is instead preferred to reduce the loads acting on the high-lift device or, in other words, to limit the enforced deformation of the high-lift device. As the maximum deformation of the high-lift device is reduced as compared to a rigid or non-collapsing hold-down element, the high-lift device may be constructed less robust. This may, in particular, advantageously allow reducing the weight of the high-lift device. Further, since the load on the fixed wing is also reduced as it does not have to bear the additional load that is required to deform the high-lift device.

The threshold may, for example, be chosen such that the load-limited hold-down element is destroyed when a load factor exceeds a value of 2.0, preferably of 1.75 and most preferably of 1.3, where the load factor is defined as the ratio of lift of an aircraft to its weight.

In a preferred embodiment the second hold-down element is the load-limited hold-down element. In other words, it is preferred that the load-limited hold-down element is the hold-down element mounted to the fixed wing.

The load-limited hold-down element is preferably formed as crash element. A crash element is an element that is rigid and stiff as long as forces acting on the crash element do not exceed a predetermined value. Once the forces exceed the predetermined value, the crash element suddenly crashes or collapses. A crash element may, for example, be made from a metal and formed with a honeycomb structure.

Alternatively, the load-limited hold-down element is in another preferred embodiment formed as a shear pin. Shear pins are well-known in the art as a means which breaks when a higher load than a predetermined threshold is applied to the shear pin.

In a further preferred embodiment the hold-down element of the first and the second hold-down element not being the load-limited hold-down element is formed as an adjustable contact pad. The adjustable contact pad is provided for adjusting a position of the high-lift device relative to the fixed wing in the retracted position of the high-lift device. Preferably the adjustable contact pad is formed by the first contact pad mounted to the high-lift device. The adjustable contact pad can advantageously be used to align the position of the high-lift device relative to the fixed wing to ensure that the trailing edge of the high-lift device is in extended contact with the upper surface of the fixed wing when the high-lift device has been retracted.

It is further preferred if the hold-down arrangement comprises an indicator means which is adapted to signal that the load-limited hold-down element has been destroyed. The, indicator means should, in particular, clearly indicate that the load-limited hold-down arrangement has been destroyed when the high-lift device is in the retracted position as the hold-down arrangement may not be visible in this situation.

In a preferred embodiment the indicator means is provided by a paint bag which is destroyed with the load-limited hold-down element. Alternatively or additionally, the indicator means may be a plastic cap which changes its color when the load-limited hold-down element is destroyed.

Further alternatively or additionally, the indicator means is triggered by establishing or destroying an electrical connection in the load-limited hold-down element when the load-limited hold-down element is destroyed. For example, the load-limited hold-down element may include a wire which rips when the load-limited hold-down element is destroyed. The destruction of the wire may trigger an electric or electronic indicator to be displayed in the cockpit of an aircraft or an entry in a maintenance directory of the aircraft may be automatically added.

In an exemplary embodiment the indicator means could also be triggered independently of the actual state of the load-limited hold-down element by measuring the load factor and activating the indicator means, for example, a light source in the cockpit of an aircraft, when the load factor exceeds a value at which the load-limited hold-down element is configured to be destroyed.

In a second aspect the problem underlying the present invention is solved by a hold-down arrangement for a wing of an aircraft. The wing comprises a fixed wing and a high-lift device, wherein the wing has a leading edge extending along a spanwise direction of the fixed wing and an upper surface forming a suction side of the fixed wing and wherein the high-lift device is movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing. The hold-down arrangement comprises a first hold-down element attachable to the high-lift device of the wing and a second hold-down element attachable to the fixed wing of the wing such that the first hold-down element is in contact with the second hold-down element when the high-lift device is in the retracted position but is not in contact when the high-lift device is in the deployed position, that the hold-down arrangement is arranged between the first support and the second support of the wing and that in the retracted position of the high-lift device the hold-down arrangement prevents the trailing edge of the high-lift device from detaching from the upper surface of the fixed wing when the fixed wing deforms in the spanwise direction. One of the first hold-down element and the second hold-down element is a load-limited hold-down element, wherein the load-limited hold-down element is configured to be destroyed when loads transmitted through the load-limited hold-down element for preventing the trailing edge of the high-lift device from detaching from the upper surface of the fixed wing exceed a threshold, wherein the hold-down arrangement does not prevent the trailing edge of the high-lift device from detaching from the upper surface of the fixed wing after the load-limited hold-down element has been destroyed.

The hold-down arrangement may be configured in the same way as the hold-down arrangement which has been described as part of the preferred embodiments of a wing for an aircraft. For the sake of brevity, details of these embodiments are not repeated here but reference is made to the preceding description. The advantages of the hold-down arrangement correspond to the advantages of the respective embodiments of a wing for an aircraft.

In a preferred exemplary aspect the problem underlying the present invention is solved by using a hold-down arrangement in a wing of an aircraft. The wing comprises a fixed wing and a high-lift device, wherein the wing has a leading edge extending along a spanwise direction of the fixed wing and an upper surface forming a suction side of the fixed wing and wherein the high-lift device is movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing. The hold-down arrangement comprises a first hold-down element attachable to the high-lift device of the wing and a second hold-down element attachable to the fixed wing of the wing such that the first hold-down element is in contact with the second hold-down element when the high-lift device is in the retracted position and is not in contact with the second hold-down element when the high-lift device is in the deployed position, that the hold-down arrangement is arranged between the first support and the second support of the wing and that in the retracted position of the high-lift device the hold-down arrangement prevents the trailing edge of the high-lift device from detaching from the upper surface of the fixed wing when the fixed wing bends in the spanwise direction. One of the first hold-down element and the second hold-down element is a load-limited hold-down element, wherein the load-limited hold-down element is configured to be destroyed when loads transmitted through the load-limited hold-down element for preventing the trailing edge of the high-lift device from detaching from the upper surface of the fixed wing exceed a threshold, wherein the hold-down arrangement does not prevent the trailing edge of the high-lift device from detaching from the upper surface of the fixed wing after the load-limited hold-down element has been destroyed.

The hold-down arrangement used in the wing may in particular correspond to the different embodiments of hold-down arrangements previously described.

Finally, in a further aspect an aircraft comprising a fuselage and a wing as in the previously described embodiments solves the problem underlying the present invention. The advantages of the aircraft correspond to the advantages of the respective embodiment of a wing comprised therein.

SUMMARY OF DRAWINGS

In the following, exemplary embodiments of a wing for an aircraft including exemplary embodiments of a hold-down arrangement will be described with reference to the drawings, wherein.

DETAILED DESCRIPTION

Figure 1:
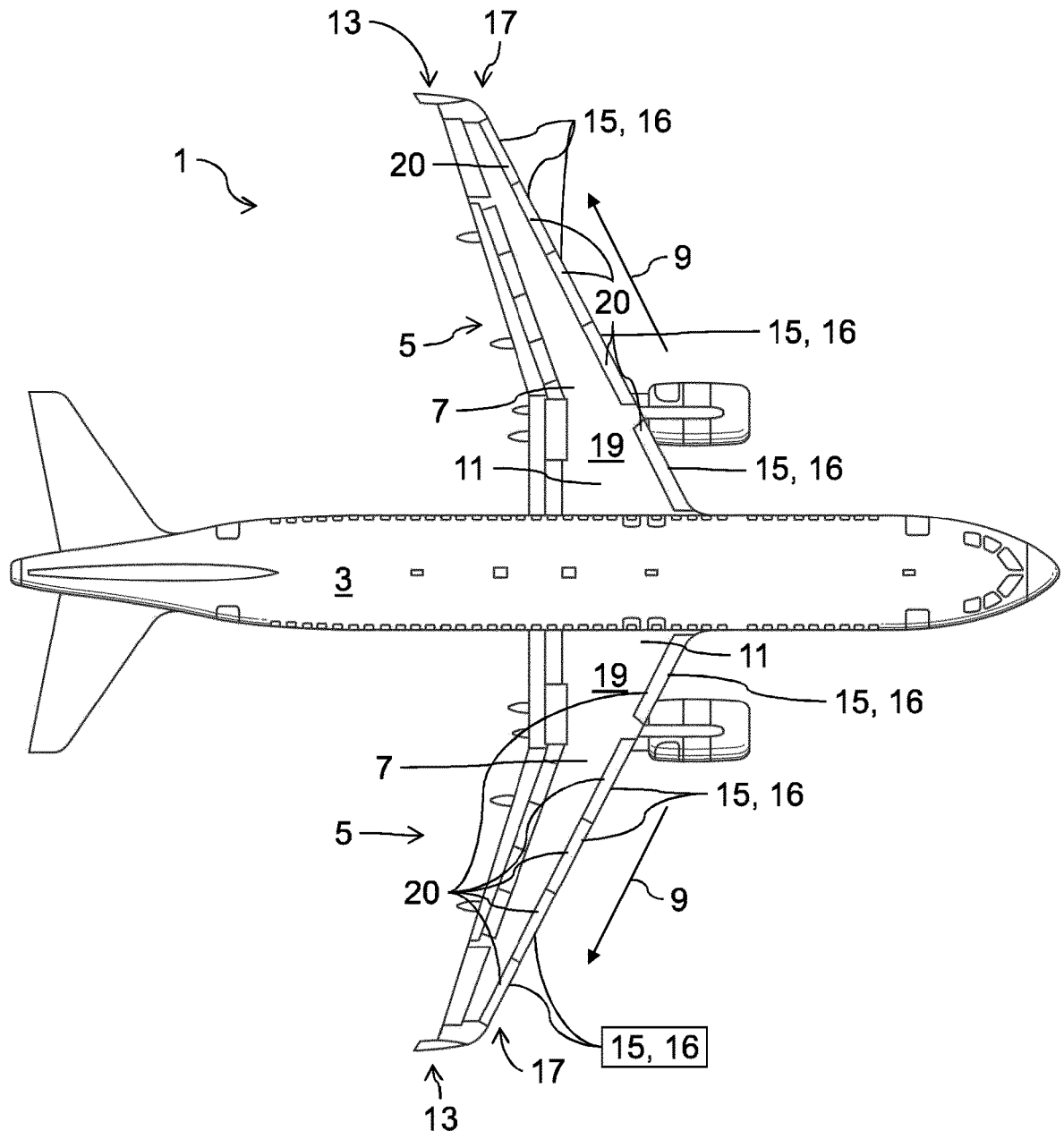
FIG. 1 shows an exemplary embodiment of an aircraft with an exemplary embodiment of a wing.

In the following description of exemplary embodiments of aircraft, wings for aircraft and hold-down arrangements like elements will be designated with like reference numerals throughout all drawings. The description will commence with FIG. 1 where an exemplary embodiment of an aircraft is shown, continue with FIGS. 2 and 3 which show a schematic drawing of a section of an exemplary embodiment of a wing and finally turn towards FIGS. 4 and 5 which each show a sectional drawing of a wing with a hold-down arrangement.

FIG. 1 shows a top view of an exemplary embodiment of an aircraft 1 with a fuselage 3 and two wings 5. Each wing 5 comprises a fixed wing 7 extending in a spanwise direction 9 between an inward end or root 11 and an outward end or wing tip 13. The wings 5 further comprise a plurality of high-lift devices 15 in forms of slats 16 mounted to the leading edge 17 of the fixed wings 7. Since FIG. 1 shows a top view of the aircraft 1, the upper surfaces 19, 20 forming the respective suction side of the fixed wings 7 and the high-lift devices 15 are visible. In FIG. 1 the high-lift devices 15 are shown in respective retracted positions in which the upper surfaces 20 of the high-lift devices 15 extend flush with the upper surface 19 of the fixed wing 5.

Figure 2:
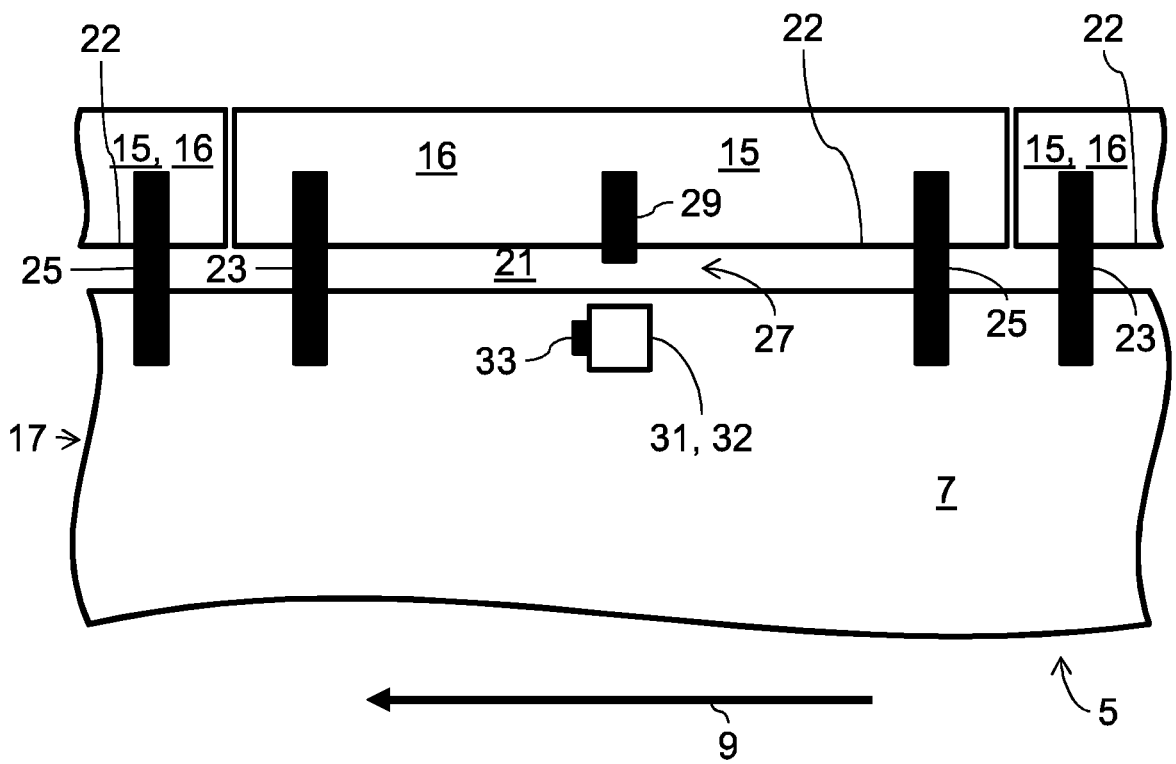
FIG. 2 shows a schematic drawing of an exemplary embodiment of a wing with an exemplary embodiment of a hold-down arrangement with a high-lift device in a deployed position.
Figure 3:
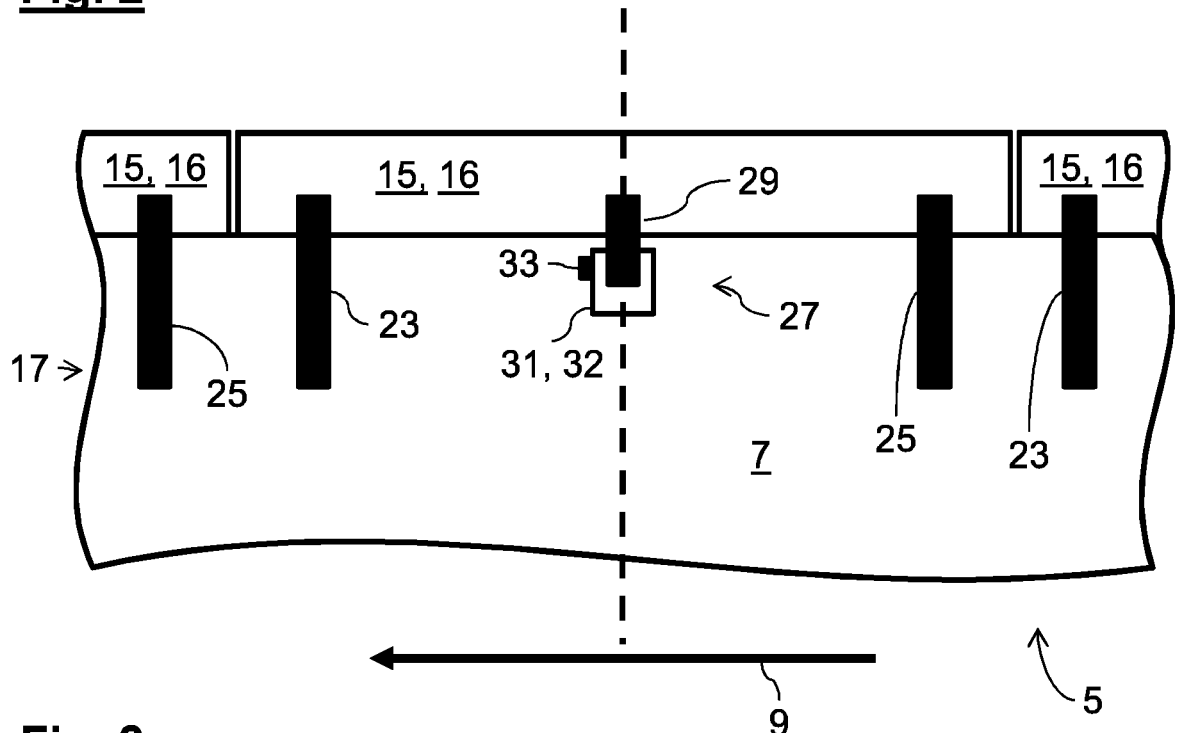
FIG. 3 shows a schematic drawing of the exemplary embodiment of a wing of FIG. 2 with the high-lift device in retracted deployed position.

FIGS. 2 and 3 each show a schematic view of a section of an exemplary embodiment of a wing 5 from below the wing 5, i.e., from the opposing side of the upper surface 19 shown in FIG. 1. The wing 5 may, in particular, be one of the wings 5 shown in FIG. 1. It comprises a fixed wing 7 and three high-lift devices 15 in form of slats 16 mounted to the leading edge 17 of the fixed wing 7. The fixed wing 7 and the inner and outer high-lift device 15 are shown in FIGS. 2 and 3 only partially. For example, neither the full length of the wing 5 in in the spanwise direction 9 nor its complete extension in the cordline direction are shown. Similarly, the inner and outer high-lift devices 15 are also only shown in part in the spanwise direction 9 of the fixed wing 7.

Figure 4:
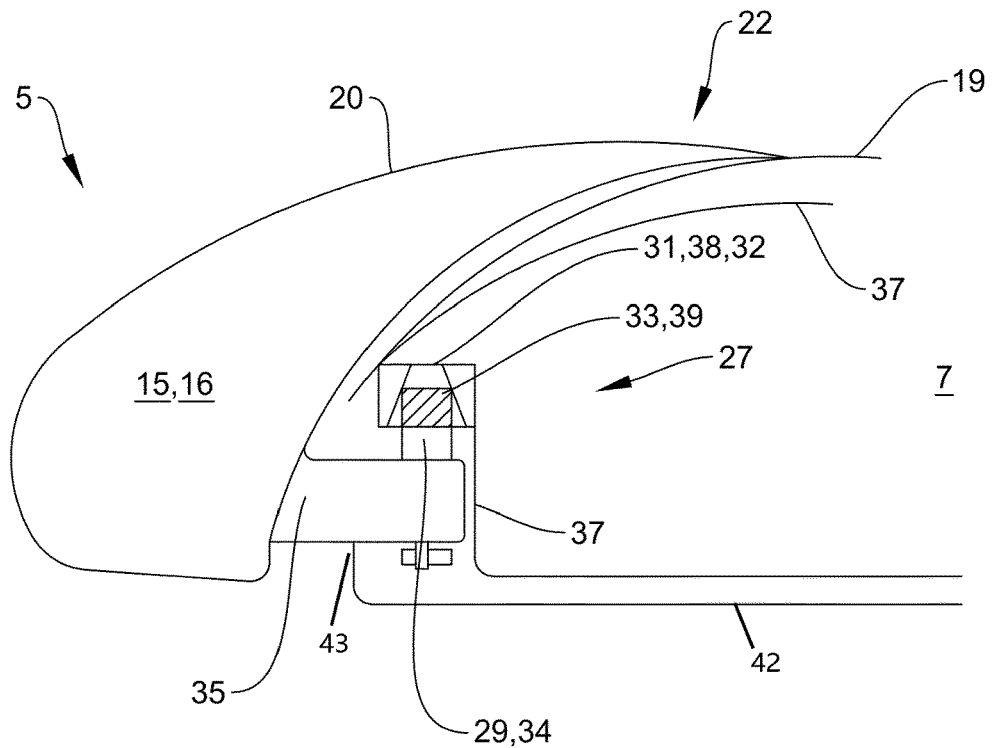
FIG. 4 shows sectional drawing of an exemplary embodiment of a wing comprising an exemplary embodiment of a hold-down arrangement and FIG. 5 shows a sectional drawing of another exemplary embodiment of a wing comprising another exemplary embodiment of a hold-down arrangement.
Figure 5:
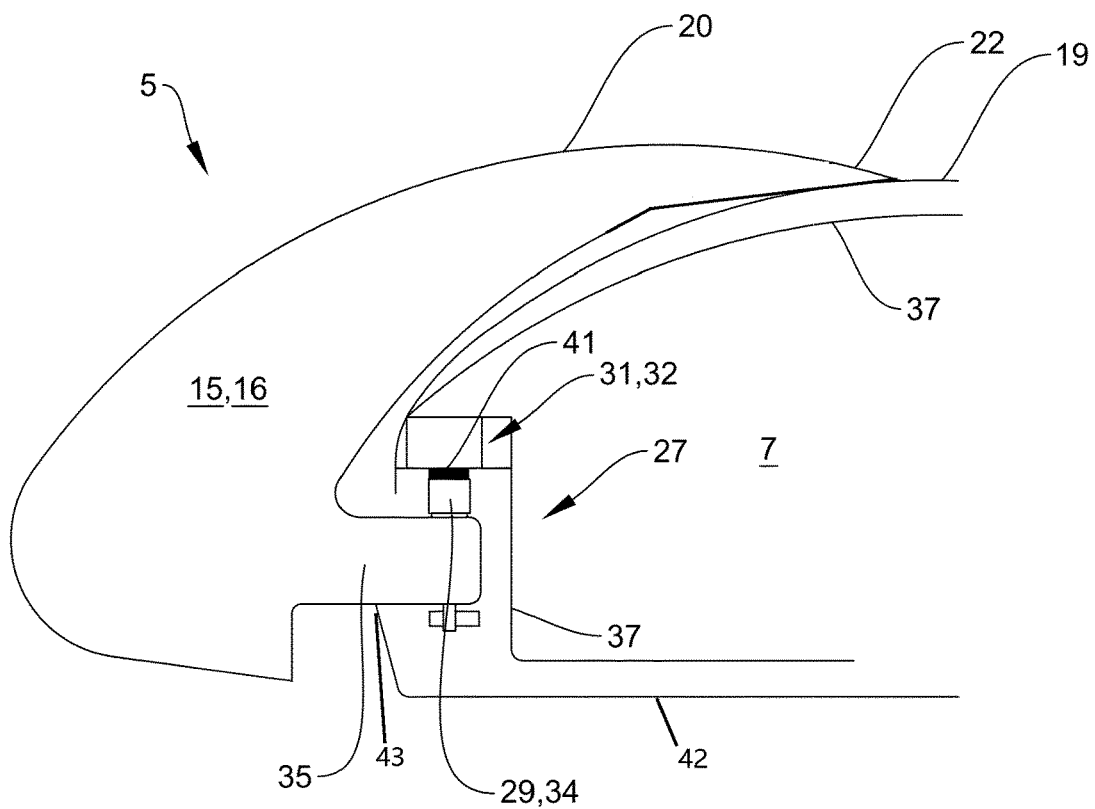

In FIG. 2 the high-lift devices 15 are shown in a deployed position indicated by a gap 21 between the fixed wing 7 and the high-lift devices 15; in FIG. 3 the high-lift devices are shown in a retracted position in which the high-lift devices 15 overlap with the fixed wing 7 and are partly hidden behind the fixed wing. The high-lift devices 15 are mounted to the fixed wing 7 such that their respective trailing edges 22 (only visible in FIG. 2) are in extended contact with the upper surface 19 of the fixed wing 7. Since FIGS. 2 and 3 show the wing 5 from below, the trailing edges 22 of the high-lift devices 15 are not visible in FIG. 3. However, for the sake of completeness it is noted that a trailing edge 22 of a high-lift device 15 in extended contact with the upper surface 19 of a fixed wing 7 is shown in FIGS. 4 and 5.

Each of the high-lift devices 15 is mounted to the leading edge 17 of the fixed wing 7 via a first support 23 and a second support 25. The supports 23, 25 are spaced apart from one another in the spanwise direction 9 of the wing 5 and enable the movement of the high-lift devices 15 between the deployed position shown in FIG. 2 and the retracted position shown in FIG. 3. One of the first and second supports 23, 25, for example, the respective first supports 23 may be driven via a drive unit (not shown) for moving the high-lift devices or slats 15. The second supports 25 may be not driven such that they only follow the motion induced by the first support 23. In such an embodiment where the high-lift devices 15 are slats 16, the first supports 23 may also be referred to as master slat tracks 23 and the second supports 25 may also be referred to as slave slat tracks 25.

As previously discussed, the lift and drag on the fixed wing 7 as well as other motions of the aircraft 1 deform the fixed wing 7 along the spanwise direction 9 of the wing 5. As each high-lift device 15 is only attached via two supports 23, 25 to the fixed wing 7, the deformation of the fixed wing 7 along the spanwise direction is not transmitted to the high-lift device. In particular, any upwards bending of the wing tip 13 caused by the increasing lift of the wing 5 with increasing velocity of the aircraft 1 would cause the fixed wing 7 to move downwards relative to the trailing edge 22 of the high-lift devices 15 in the region between the first and second supports 23, 25. This may cause the respective trailing edges 22 of the high-lift devices 15 to detach from the upper surface 19 of the fixed wing 7 so that the upper surfaces 19, 20 of the fixed wing 7 and the high-lift devices 15 are no longer flush and the aerodynamic performance of the wing 5 are affected negatively. In particular, the drag may be increased.

Hence, for each of the high-lift devices 15 a hold-down arrangement 27 is provided which comprises a first hold-down element 29 attached to the respective high-lift device 15 and a second hold-down element 31 attached to the fixed wing 7. The hold-down arrangement 27 is arranged between first and second supports 23, 25 of the respective high-lift device 15. As can be seen in FIGS. 2 and 3, when the high-lift devices 15 are in their respective deployed position, the first hold-down element 29 attached to the high-lift device 15 is not in contact with the second hold-down element 31 attached to the fixed wing 7. However, when the high-lift device 15 is in the retracted position, the first hold-down element 29 comes into contact with the second hold-down element 31. In other words, the first hold-down element 29 is only in contact with the second hold-down element 31 when the high-lift device 15 to which the first hold-down element 29 is mounted is in its retracted position. It should be pointed out that for technical reason a first contact will need to be established before the high-lift device 15 has reached its final retracted position. However, the contact is essentially limited to the retracted position.

Once the first and second hold-down elements 29, 31 have come into contact or have been brought into engagement with one another, the second hold-down element 31 holds the first hold-down element 29 down and thus transmits any relative downward deformation of the fixed wing 7 to the high-lift device 15. Thereby, the high-lift device 15 is forced to deform with the fixed wing 7 and the trailing edge 22 is prevented from detaching from the upper surface 20 of the fixed wing 7.

In order to limit the enforced spanwise deformation of the high-lift devices 15, the second hold-down element 31 is formed as a load-limited hold-down element 32 which is destroyed when the forces or loads transmitted through the hold-down arrangement 27 from the fixed wing 7 to the high-lift device 15 exceed a threshold. The threshold is chosen such that the load-limited hold-down element 32 withstands loads generated during regular flight conditions and common flight maneuvers but is destroyed when the loads reach the structural or operational limits of the slats 16, for example, when the aircraft 1 operates in corners of the flight envelope, i.e., during extreme flight conditions. Once the second hold-down element 31 has been destroyed, the hold-down arrangement 27 does no longer prevent the trailing edge 22 from detaching from the upper surface 19 of the fixed wing 7 when the latter is deformed in the spanwise direction 9. Hence, both the high-lift device 15 and the fixed wing 7 have to bear less loads and may, therefore, be designed less robust which may provide a production cost and/or weight benefit.

The hold-down arrangement 27 further comprises an indicator means 33 which indicates to maintenance personal that the load-limited hold-down element 32 has been destroyed. For example, the indicator means 33 may be paint-filled bag that explodes when the load-limited hold-down element 32 is destroyed and colors the leading edge 17 of the fixed wing 7. Maintenance personal can thus by visual inspection alone determine that a load-limited hold-down element 2 has been destroyed and needs to be replaced, preferably without having to move the high-lift devices 15 to their respective deployed position.

FIG. 4 shows a more detailed exemplary embodiment of a wing 5 comprising an exemplary embodiment of a hold-down arrangement 27. The wing 5 may, for example, be the wing 5 of FIG. 1, 2 or 3. Only a partial section through the wing 5 is shown in FIG. 4. With regard to features of the wing 5 not shown in FIG. 4 reference is made to FIGS. 1 to 3.

The wing 5 shown in FIG. 4 also comprises a fixed wing 7 to which a high-lift device 15 in form of a slat 16 is mounted using two supports (not shown). The fixed wing 7 includes the upper surface 19, lower surface 42 and leading edge 43. In FIG. 4 the slat 16 is shown in the retracted position in which its trailing edge 22 is in extended contact with the upper surface 19 of the fixed wing 7 such that the upper surfaces 19, 20 of the high-lift device 15 and the fixed wing 7 form a continuous surface.

The wing 5 comprises a hold-down arrangement 27 with a first and a second hold down element 29, 31. The first hold-down element 29 is an adjustable contact pad 34 which is mounted to a hold-down rib 35 of the slat 15. The contact pad 34 is adjustable in that its height relative to the hold-down rib 35 can be adjusted to adapt the position of the slat 15 in their respective retracted position. The first hold-down element 29 is in contact with a second hold-down element 31 that is also part of the hold-down arrangement 27. The second hold-down element 31 is a load-limited hold-down element 32 that is mounted to the fixed wing via a rib 37 and destroyed when the load acting through the load-limited hold-down element 32 exceeds a threshold. To this end the second hold-down element 31 in FIG. 4 is formed as a crash element 38 which is very stiff up to the threshold and suddenly collapses when the threshold is exceeded.

Inside the crash element 38 an indicator means 33 in form of a paint bag 39 is arranged which is destroyed when the crash element 38 collapses and gives a visual indication to personal inspecting the wing 5 by coloring, for example, the leading edge 17 of the fixed wing 7 with paint.

FIG. 5 shows another exemplary embodiment of a wing 5 comprising an exemplary embodiment of a hold-down arrangement 27. The wing 5 and the hold-down arrangement 27 of FIG. 5 only differ from the wing 5 and the hold-down arrangement 27 of FIG. 4 in the way the second (load-limited) hold-down element 31, 32 attached to the fixed wing 7 is formed. Thus, the description of the embodiments of FIG. 5 will be limited to those aspects that differ from the embodiment of FIG. 4.

The second hold-down element 31 of the embodiment shown in FIG. 5 is formed as a shear pin 41 which is designed to bear loads up to the threshold and shear off when the loads transmitted through the hold-down arrangement 27 exceed the threshold. The shear pin 41 is includes an indicator means in form of electrical wiring (not shown separately from the shear pin 41) that is destroyed with the shear pin 41, when the shear pin 41 is destroyed. The wiring can be used to test whether the shear pin 41 is intact. For example, when the shear pin 41 is destroyed, an electrical signal may be generated that can result in the pilots of the aircraft 1 or maintenance personal being notified that the shear pin 41 has been destroyed.

The invention claimed is:

1. A wing for an aircraft comprising:
   a fixed wing with a leading edge extending along a spanwise direction of the fixed wing, an upper surface forming a suction side of the fixed wing and a lower surface forming a pressure side of the fixed wing,
   a high-lift device movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing, and
   a hold-down arrangement between the first support and the second support and comprising a first hold-down element attached to the high-lift device and a second hold-down element attached to the fixed wing, wherein the hold-down arrangement is configured such that the first hold-down element is in contact with the second hold-down element when the high-lift device is in the retracted position and is not in contact with the second hold-down element when the high-lift device is in the deployed position, and wherein in the retracted position of the high-lift device the hold down arrangement is configured to prevent the trailing edge of the high-lift device from detaching from the upper surface of the fixed wing when the fixed wing deforms in the spanwise direction,
   wherein one of the first hold-down element and the second hold-down element is a load-limited hold-down element,
   wherein the load-limited hold-down element is configured to be destroyed when loads transmitted through the load-limited hold-down element for preventing the trailing edge of the high-lift device from detaching from the upper surface of the fixed wing exceed a threshold,
   wherein the hold-down arrangement does not prevent the trailing edge of the high-lift device from detaching from the upper surface of the fixed wing after the load-limited hold-down element has been destroyed, and wherein the second hold-down element is between the upper surface and the lower surface of the fixed wing and is aft of the leading edge of the fixed wing.

2. The wing according to claim 1, wherein the second hold-down element is the load-limited hold-down element.

3. The wing according to claim 1, wherein the load-limited hold-down element is a crash element.

4. The wing according to claim 1, wherein the load-limited hold-down element is a shear pin.

5. The wing according to claim 1, wherein the hold-down element of the first hold-down element and the second hold-down element not being the load-limited hold-down element is an adjustable contact pad, wherein the adjustable contact pad is configured to adjust a position of the high-lift device relative to the fixed wing in the retracted position of the high-lift device.

6. The wing according to claim 1, wherein the high-lift device is a slat.

7. The wing according to claim 1, wherein the hold-down arrangement comprises an indicator means adapted to signal that the load-limited hold-down element has been destroyed.

8. The wing according to claim 7, wherein the indicator means is a paint bag which is destroyed with the load-limited hold-down element or wherein the indicator means is a plastic cap which changes its color when the load-limited hold-down element is destroyed.

9. The wing according to claim 7, wherein the indicator means is triggered by establishing or destroying an electrical connection in the load-limited hold-down element when the load-limited hold-down element is destroyed.

10. An aircraft comprising a fuselage and the wing according to claim 1.

11. The wing of claim 1, wherein the hold-down arrangement does not overlap along the spanwise direction the first or second supports and is spaced apart along the spanwise direction from the first and second supports.

12. A hold-down arrangement for a wing of an aircraft, the wing comprising a fixed wing and a high-lift device, wherein the fixed wing has a leading edge extending along a spanwise direction of the fixed wing, an upper surface forming a suction side of the fixed wing and a lower surface forming a pressure side of the fixed wing, and wherein the high-lift device is movable between a retracted position and a deployed position and attached to the leading edge of the fixed wing via a first support and a second support, wherein the first support is spaced apart from the second support in the spanwise direction, and wherein in the retracted position a trailing edge of the high-lift device is in extended contact with the upper surface of the fixed wing, wherein the hold-down arrangement comprises a first hold-down element attachable to the high-lift device of the wing and a second hold-down element attachable to the fixed wing of the wing such that the first hold-down element is in contact with the second hold-down element when the high-lift device is in the retracted position but is not in contact with the second hold-down element when the high-lift device is in the deployed position, that the hold-down arrangement is arranged between the first support and the second support of the wing and that in the retracted position of the high-lift device the hold-down arrangement prevents the trailing edge of the high-lift device from detaching from the upper surface of the fixed wing when the fixed wing deforms in the spanwise direction, wherein at least one of the first hold-down element and the second hold-down element is a load-limited hold-down element, wherein the load-limited hold-down element is configured to be destroyed when loads transmitted through the load-limited hold-down element configured to prevent the trailing edge of the high-lift device from detaching from the upper surface of the fixed wing exceed a threshold, wherein the hold-down arrangement does not prevent the trailing edge of the high-lift device from detaching from the upper surface of the fixed wing after the load-limited hold-down element has been destroyed, and wherein the second hold-down element is between the upper surface and the lower surface of the fixed wing and is aft of the leading edge of the fixed wing.

13. The hold-down arrangement of claim 12, wherein the hold-down arrangement does not overlap along the spanwise direction the first or second supports and is spaced apart along the spanwise direction from the first and second supports.

* * * * *